(12) United States Patent
Takahama et al.

(10) Patent No.: US 7,266,454 B2
(45) Date of Patent: Sep. 4, 2007

(54) OBSTACLE DETECTION APPARATUS AND METHOD FOR AUTOMOTIVE VEHICLE

(75) Inventors: Taku Takahama, Kanagawa (JP);
Takeshi Kimura, Yokohama (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 379 days.

(21) Appl. No.: 10/878,391

(22) Filed: Jun. 29, 2004

(65) Prior Publication Data
US 2005/0004762 A1   Jan. 6, 2005

(30) Foreign Application Priority Data

Jul. 1, 2003   (JP)   ............................. 2003-189616
Jun. 3, 2004   (JP)   ............................. 2004-165419

(51) Int. Cl.
*G06G 7/78* (2006.01)
(52) U.S. Cl. ..................................................... 701/301
(58) Field of Classification Search ................. 701/301
See application file for complete search history.

(56) References Cited

U.S. PATENT DOCUMENTS 6,687,386 B1 *   2/2004   Ito et al. ..................... 382/103
6,859,730 B2 *   2/2005   Sekiguchi ................... 701/301
2002/0191837 A1 * 12/2002   Takeda et al. .............. 382/154

FOREIGN PATENT DOCUMENTS

JP    11-44533 A    2/1999
JP    2002-117392 A    4/2002

OTHER PUBLICATIONS

U.S. Appl. No. 10/878,213, filed Jun. 29, 2004, Takahama et al.

* cited by examiner

*Primary Examiner*—Thu V. Nguyen
(74) *Attorney, Agent, or Firm*—Foley & Lardner LLP

(57) ABSTRACT

In obstacle detection apparatus and method for an automotive vehicle, an image fetching section fetches a situation of a forward detection zone in a form of an image, a noticeable object outputting section outputs a positional information of an object to be noticeable for the vehicle, and an image processing section performs an image processing for a region of the image fetching section on the basis of an output of the noticeable object outputting section to detect the object, the image processing section including a first technique mainly to detect the position of the object and a second technique mainly to track the object, the second technique detecting the object when the object detection by means of the first technique becomes not enabled to be carried out.

12 Claims, 10 Drawing Sheets

OBSTACLE DETECTION APPARATUS AND METHOD FOR AUTOMOTIVE VEHICLE

BACKGROUND OF THE INVENTION

1. Field of the Invention

The present invention relates to obstacle detection apparatus and method for an automotive vehicle which perform an image processing for a photographed result by CCD (Charge Coupled Device) or CMOS (Complementary Monolithic Oxide Semiconductor) image sensing element mounted camera to detect a position of at least one object present in a forwarding direction of a host vehicle in which the obstacle detection apparatus according to the present invention is mounted.

2. Description of the Related Art

A Japanese Patent Application First Publication No. 2002-117392 published on Apr. 19, 2002 exemplifies a first previously proposed obstacle detection apparatus for an automotive vehicle. In the first previously proposed obstacle detection apparatus, a monocular camera is used together with a laser radar for a detection of a preceding vehicle which is located ahead of the host vehicle at a short distance so as to enable a robust tracking of the preceding vehicle since a distance measurement over the short distance to the laser radar is not stable. Similarly, a Japanese Patent Application First Publication No. Heisei 11-44533 published on Feb. 16, 1999 exemplifies a second previously proposed obstacle detection apparatus. In the second previously proposed obstacle detection apparatus, an image region corresponding to a position of the object detected by the radar is stored as a first reference pattern and another region having a highest correlation value between the detected position of the radar and a camera image is stored as a second reference pattern. Subsequently, the second previously proposed obstacle detection apparatus detects the position of the object on the basis of a center coordinate of the second reference pattern in a case where the radar has lost the object under trapping. Thus, it is possible to trap the preceding vehicle through the camera image processing even if the radar has lost the preceding vehicle.

SUMMARY OF THE INVENTION

However, in each of the first and second previously proposed obstacle detection apparatuses, a sensor on which the reference is made is always the laser radar. Hence, it is impossible to detect the position of the preceding vehicle through the image processing during the trapping of the object through the radar. Therefore, it is not possible to detect a more highly accurate detection of the object through the image processing during the detection of the object through the laser radar. That is to say, in each of the previously proposed obstacle detection apparatuses, a compatibility between the detection of the position and the tracking of the object cannot be established.

It is, hence, an object of the present invention to provide obstacle detection apparatus and method for an automotive vehicle which can establish the compatibility between the position detection of the object and the object tracking.

According to one aspect of the present invention, there is provided an obstacle detection apparatus for an automotive vehicle, comprising: an image fetching section that fetches a situation of a forward detection zone in a form of an image; a noticeable object outputting section that outputs a positional information of an object to be noticeable for the vehicle; and an image processing section that performs an image processing for a region of the image fetching section on the basis of an output of the noticeable object outputting section to detect the object, the image processing section including a first technique mainly to detect the position of the object and a second technique mainly to track the object, the second technique detecting the object when the object detection by means of the first technique becomes not enabled to be carried out.

According to another aspect of the present invention, there is provided an obstacle detection method for an automotive vehicle, comprising: fetching a situation of a forward detection zone in a form of an image; outputting a positional information of an object to be noticeable for the vehicle; and performing an image processing for a region of the image fetching section on the basis of an output of the noticeable object outputting section to detect the object, at the image processing, a first technique mainly to detect the position of the object and a second technique mainly to track the object are included, the second technique detecting the object when the object detection by means of the first technique becomes not enabled to be carried out.

This summary of the invention does not necessarily describe all necessary features so that the present invention may also be sub-combination of these described features.

DETAILED DESCRIPTION OF THE PREFERRED EMBODIMENTS

Reference will hereinafter be made to the drawings in order to facilitate a better understanding of the present invention.

Figure 1:
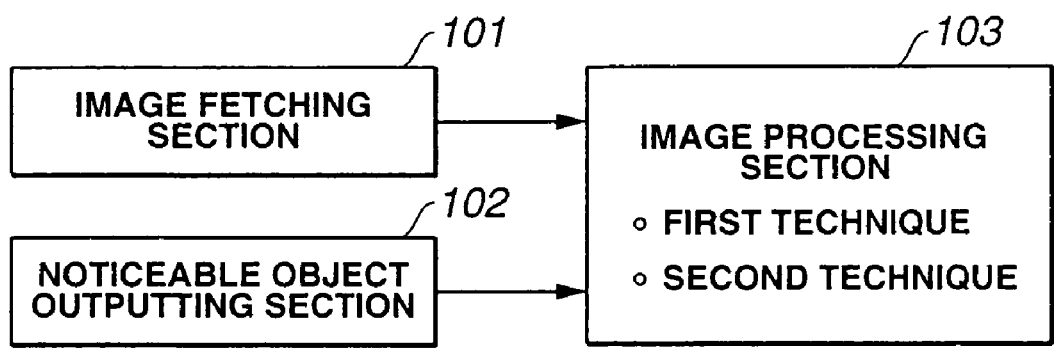
FIG. 1 is a functional block diagram for explaining a general concept of an obstacle detection apparatus according to the present invention.

FIG. 1 shows a functional block diagram of an obstacle detection apparatus for an automotive vehicle representing a general concept according to the present invention. In FIG. 1, obstacle detection apparatus is constituted by an image fetching section 101 which photographs an image in a forward photographing zone of a host vehicle in which the obstacle detection apparatus is mounted, a noticeable object position outputting section 102 which outputs a positional information of a noticeable object, and an image processing section 103 which processes an image derived from image fetching section 101 to detect the presence of the object on the basis of an image region of the noticeable object outputted by a noticeable position outputting section 102. Image processing section 103 includes a first technique to detect a position of an object and a second technique to perform a tracking for the object.

In the obstacle detection apparatus, in a system in which one (noticeable) object which is worth notice is selected from among an object group detected by the laser radar and the selected object is redundantly tracked not only through the laser radar but also through the image processing, a robust tracking of the selected object with a high accuracy through the image processing can be achieved irrespective of a detection situation of the radar.

(First Embodiment)

Figure 2:
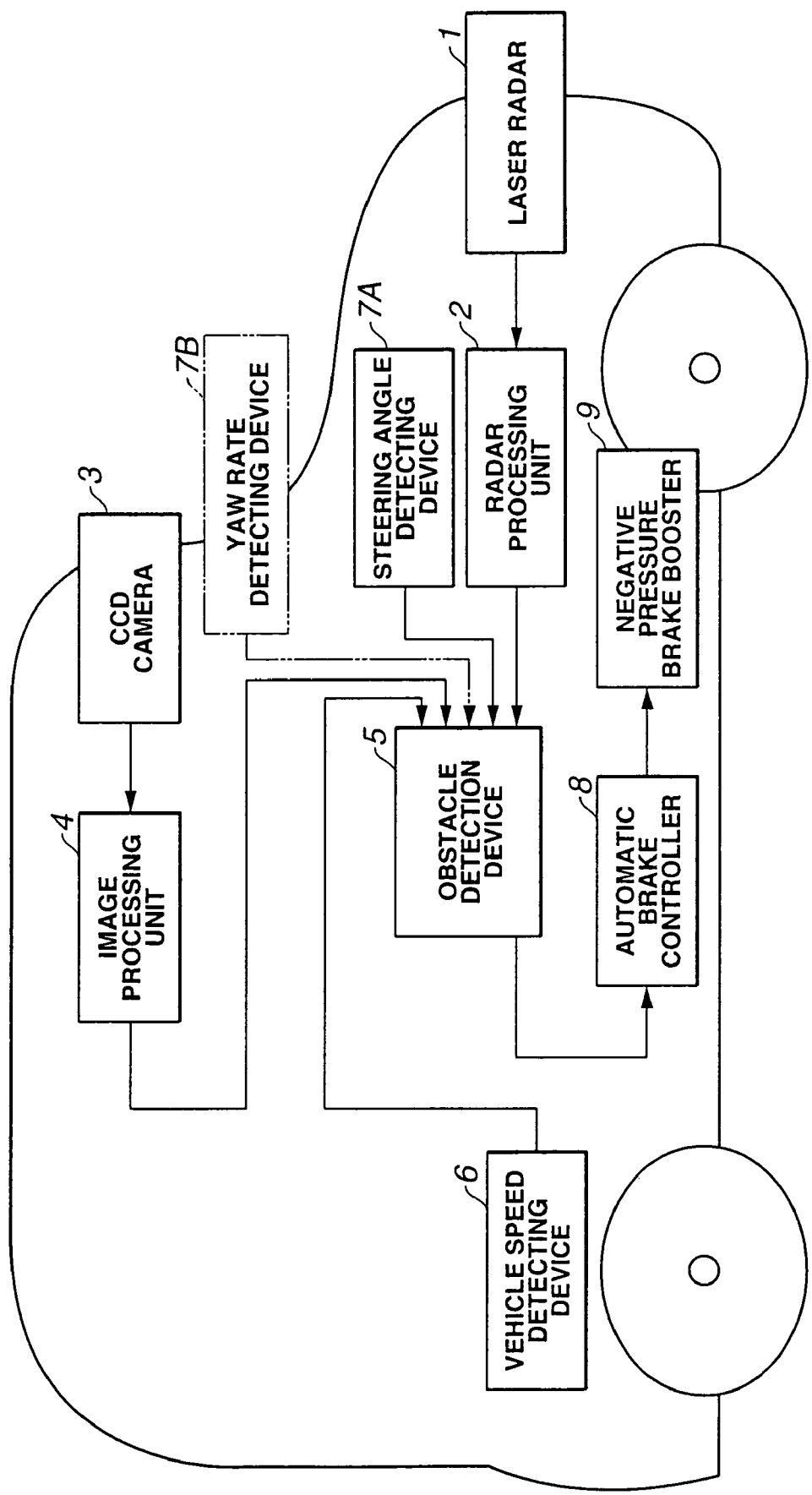
FIG. 2 is a schematic circuit block diagram of the obstacle detection apparatus in a first preferred embodiment according to the present invention.

FIG. 2 shows a hardware structure of the obstacle detection apparatus in a first embodiment according to the present invention. A radar processing unit 2 to extract an obstacle candidate from a result of scanning by means of a scanning type laser radar 1 is connected to an obstacle detection device 5. This radar processing unit 2 carries out a calculation of two-dimensional coordinate values (a direction on an inter-vehicle distance and a vehicular width direction) with the vehicle (a host vehicle in which obstacle detection apparatus in the first embodiment is mounted) as an origin for one or a plurality of obstacle candidates and a width (a size) of each of the obstacle candidates.

A progressive scan type CCD camera (image fetching section) which grasps a situation of a vehicular forward photographing zone at high speeds is mounted in the vehicle. A result of photograph is supplied to an image processing unit 4. Image processing unit 4 stores the image data on the vicinity to coordinates of obstacle candidates trapped by means of radar processing unit 2 and carries out such a process that the image processing causes the lost object to be detected in a case where the radar detected object is lost due to a pitching variation of a host vehicle body. Outputs of radar processing unit 2 and image processing unit 4 are connected to obstacle detection device 5. A vehicle speed detecting device 6 to detect non-driven left and right road wheel velocities and a steering angle detecting device 7A to detect a front road wheel steering angle are connected to obstacle detection device 5 in order to estimate state variables of the host vehicle. It is noted that a yaw rate detecting device 7B to detect a vehicular yaw rate is connected to obstacle detection device 5. From such a hardware structure as described above, obstacle detection device 5 carries out a high degree of an obstacle detection system for the automotive vehicle by calculating and processing (performing) the corresponding functions.

Obstacle detection device 5 selects each object position detected by means of radar processing unit 2 and the position of the object under tracking to determine whether the detected object provides an obstacle for the host vehicle and supplies a result of the determination to an automatic brake controller 8. A negative pressure brake booster 9 to achieve an arbitrary braking force is connected to front and rear road wheels. A braking force command voltage from automatic brake controller 8 of the host vehicle is supplied to a solenoid valve of negative brake booster 9. These radar processing unit 2 and automatic brake controller 8 are constituted by microcomputers, their peripheral parts, various kinds of actuators (drive circuits) and mutually supply and receive the information via communication lines interconnected therebetween.

Next, an operation of the obstacle detection apparatus in the first embodiment will be described below with reference to flowcharts shown in FIGS. 3A through 5.

[Selective Control Processing Through Image Processing Technique]

Figure 3A:
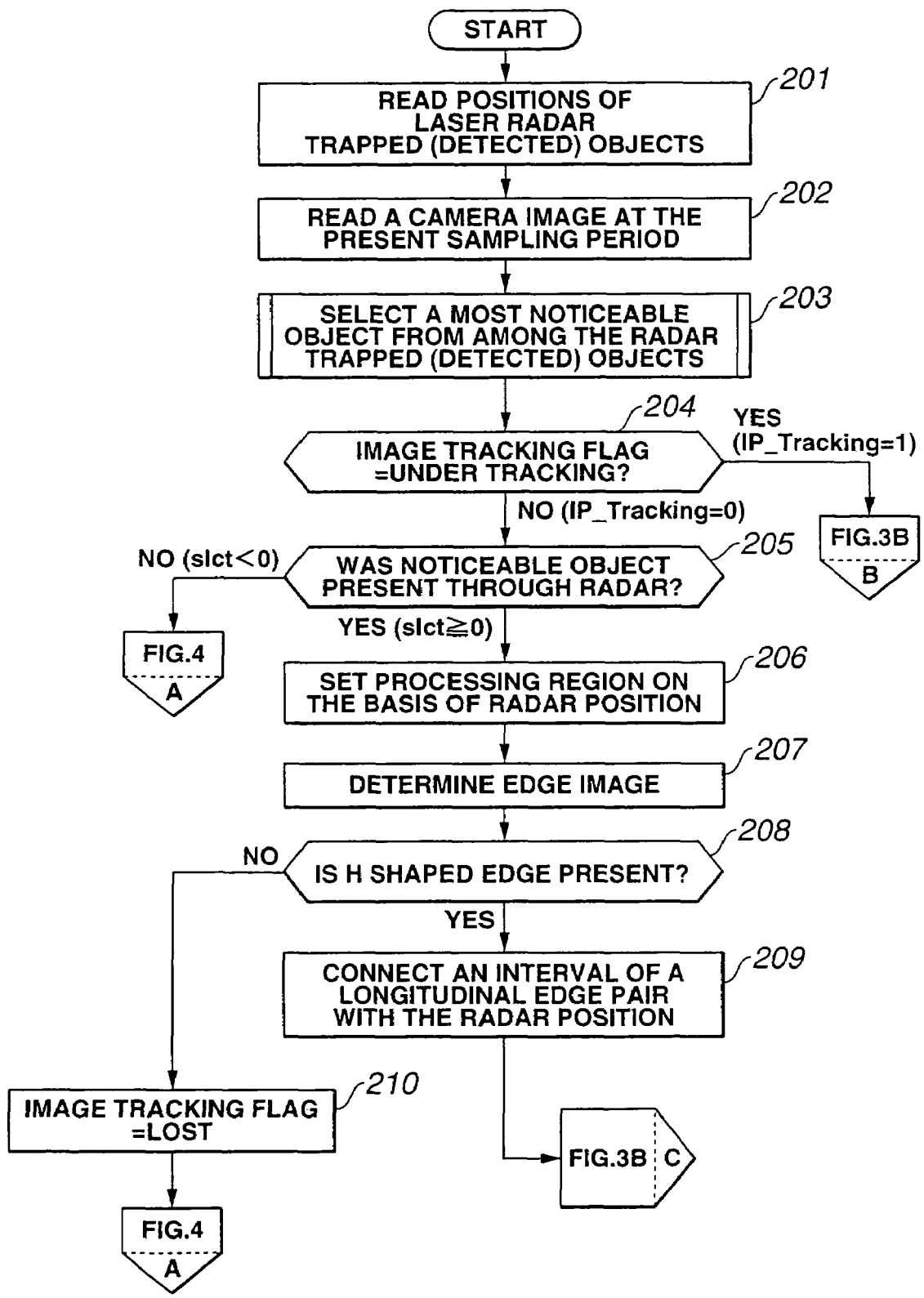
FIGS. 3A and 3B are integrally a flowchart representing a flow of an image processing technique selective control procedure executed in the first preferred embodiment shown in FIG. 2.
Figure 3B:
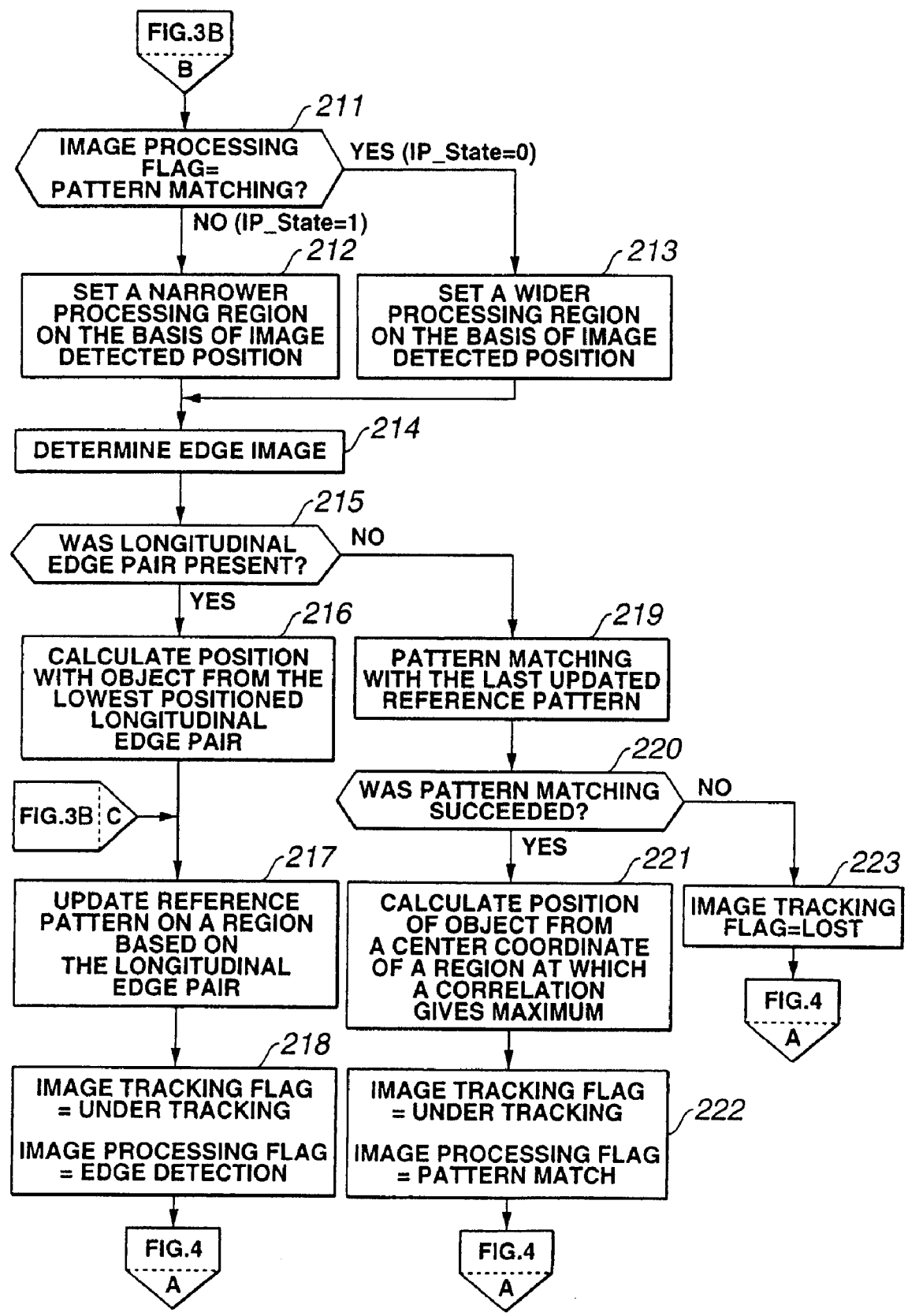
Figure 4:
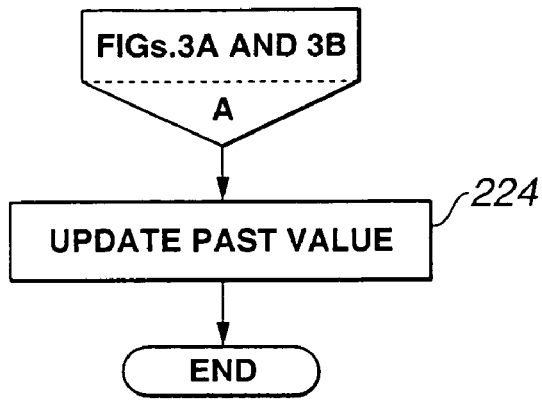
FIG. 4 is a part of the flowchart representing the flow of the image processing technique selective control procedure executed in the first preferred embodiment shown in FIG. 2.
Figure 5:
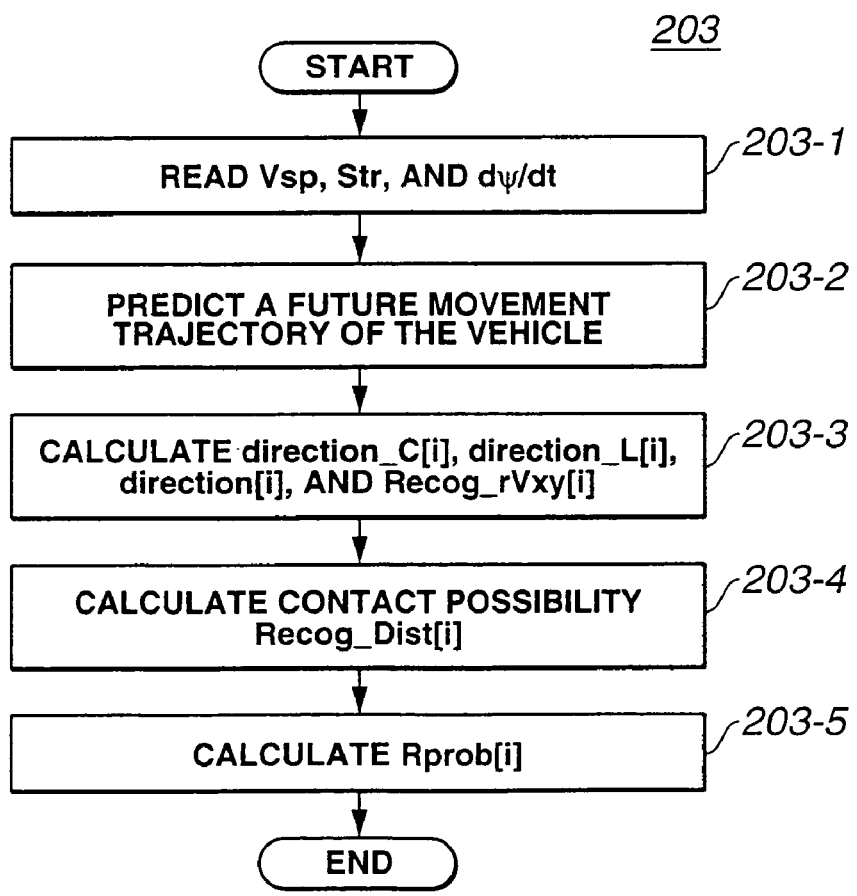
FIG. 5 is a detailed flowchart representing a noticeable object selective control procedure at a step 203 shown in FIG. 3A.
Figure 7A:
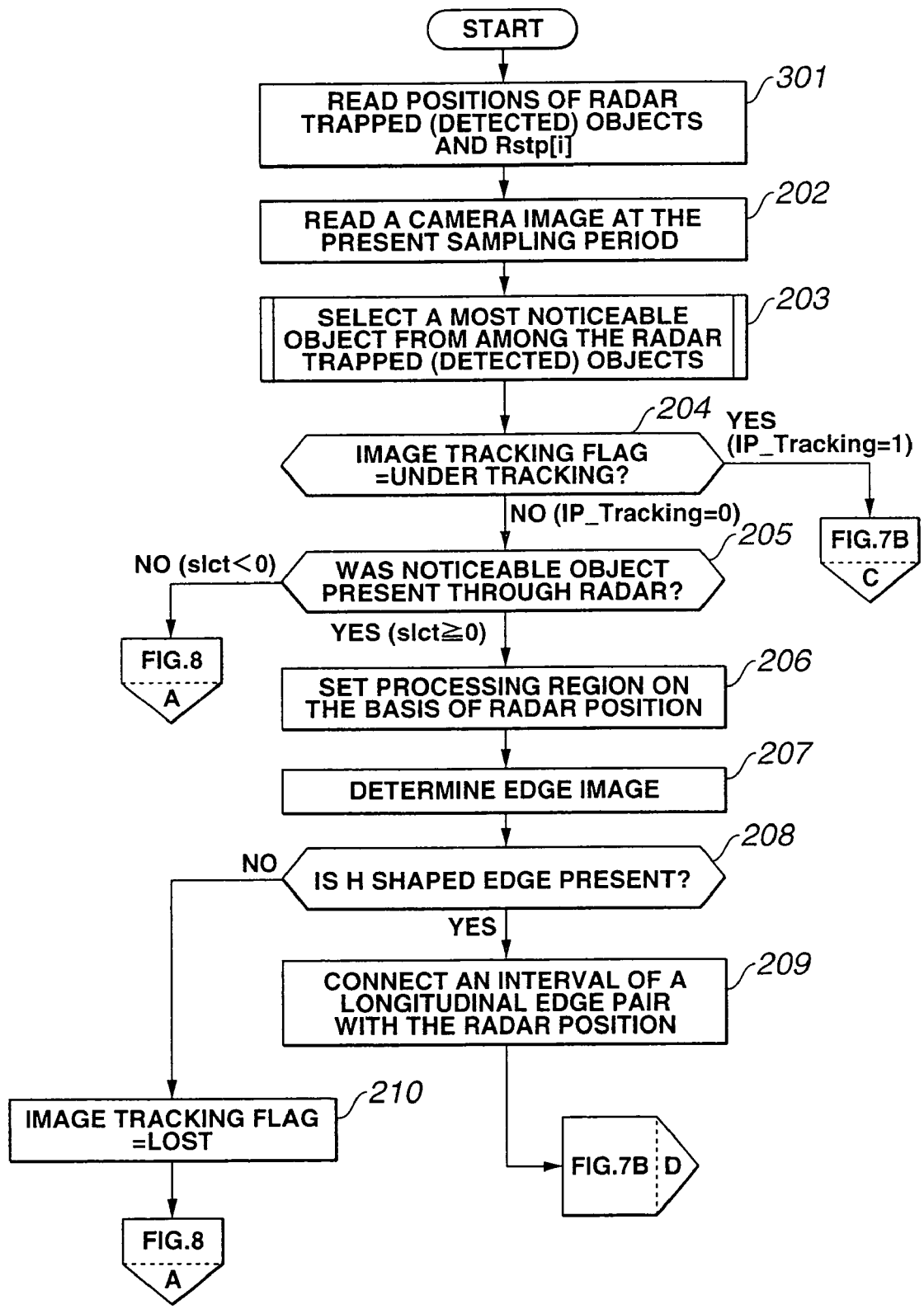
FIGS. 7A and 7B are integrally a flowchart representing the flow of the image processing technique selective control procedure executed in a second preferred embodiment according to the present invention.
Figure 7B:
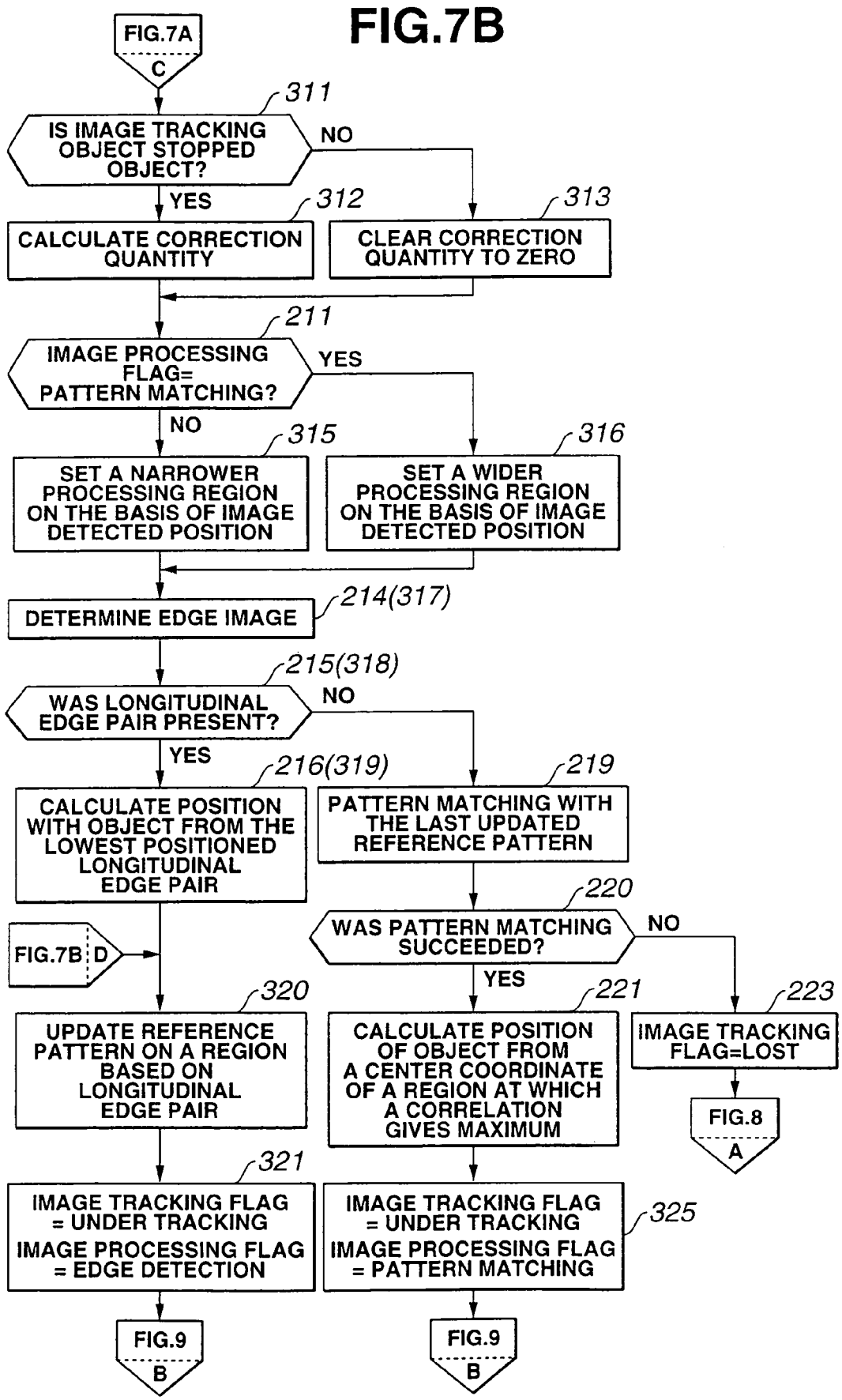

FIGS. 3A, 3B, and 4 integrally show a flow of a selective control process through image processing technique executed in the first embodiment, for example, 33 milliseconds.

At a step 201, obstacle detection device 5 reads positions of respective objects detected by means of scanning type laser radar 1 in the form of R (Px_$z_o$[i], Py_$z_o$[i]). It is noted that a subscript x denotes a position of each object in a lateral direction (a vehicular width direction), a subscript y denotes a position of each object in a longitudinal direction (a vehicular inter-vehicle distance direction). In addition, a subscript i denotes an integer representing an ID (Identification) number of each detected object and which is equal to or larger than zero, $z_o$ denotes a present value, $z_1$ denotes a past value one sampling period (33 milliseconds) before a present time, and $Z_n$ denotes the past value n sampling period before the present time.

At a step 202, obstacle detection device 5 fetches a result of photographing (an image) at the present sampling period from CCD camera 3. At a step 203, obstacle detection device 5 selects one most noticeable object from among respective objects (each ID number) detected at step 201. A specific flow thereof will be described with reference to a detailed flowchart of FIG. 5.

That is to say, at a step 203-1, obstacle detection device 5 reads a vehicle speed Vsp of the host vehicle, a steering angular displacement Str of the host vehicle, and a yaw rate dψ/dt of the host vehicle (these values being) at the present sampling period.

At a step 203-2, obstacle detection device 5 predicts a future movement trajectory (orbit) of the host vehicle according to the following equation (1) as a turning radius R of the vehicle using the vehicle speed Vsp, the steering angular displacement, and the yaw rate determined at step 203-1.

$R = Vsp/(d\psi/dt)$ (in the case where $Vsp > 30$ Km/h)

$R = (1f + 1r)/Str$ (in the case where $Vsp \leq 30$ Km/h)  (1).

In equations (1), 1f denotes a distance from a front road wheel axle of the host vehicle to a weight center and 1r denotes a distance from a rear road wheel axle thereof to the weight center.

At a step 203-3, obstacle detection device 5 derives a direction of a relative velocity vector having a highest possibility of contacting of the trapped object with the host vehicle from the positions of the detected objects read at step 201 according to the following equation (2) and a direction of relative velocity vector in a case where the detected object is very slightly contacted with the host vehicle according to the following equation (3), from the positions of the detected objects read at step 201, respectively.

direction_$C$[i]=atan($Px\_z_o[i]/Py\_z_o[i]$)  (2)

and direction_$L$ [i]=atan (($Px\_z_o$ [i]+$W\_z_o$[i]/2+w/2)/ ($Py\_z_o$[i]))  (3).

In equation (3), w denotes a width of the host vehicle.

Next, obstacle detection device 5 calculates a direction of a relative velocity vector of one obstacle candidate to the host vehicle from the following equation (4) and calculates a possibility that the detected object can provide an obstacle for the host vehicle from the following equation (5).

$$\text{direction}[i] = \text{atan}(rvx\_z_o[i]/rvy\_z_o[i]) \quad (4).$$

$$\text{Recog\_rvxy}[i] = (-0.2/fabs(\text{direction\_}L[i] - \text{direction\_}C[i]))*fabs(\text{direction\_}C[i] - \text{direction}[i]) + 1.0 \quad (5).$$

In equation (5), Recog_rvxy takes a range from 0.8 to 1 when detected object i has a possibility of the contact of the object with the host vehicle and gives a smaller value as the possibility becomes lower At step 203-4, obstacle detection device 5 determines a possibility of contacting between the detected object i and the host vehicle from the following equation (6) from future movement trajectory R of the vehicle calculated at equation (1).

$$\text{Recog\_Dist}[i] = (-0.2/w/2)*abs(hypot(Py\_z_o[i], (Px\_z_o[i] - R)) - R) + 1.0 \quad (6).$$

In equation (6), hypot(p1, p2) denotes an argument (a parameter) to return $(p1*p1+p2*p2)^{0.5}$ and Recog_Dist[i] takes a range from 0.8 to 1 when there is a possibility of the contact between the detected object and the host vehicle and gives a smaller value as the possibility becomes lower.

At a step 203-5, obstacle detection device 5 integrates two contact possibilities calculated by the equations (5) and (6) into one contact possibility.

$$\text{Rprob}[i] = func(Th\_rvy\_L, Th\_rvy\_H, rvy\_z_o[i], \text{Recog\_rvxy}[i], \text{Recog\_}_{Dist}[i]) \quad (7).$$

Figure 6:
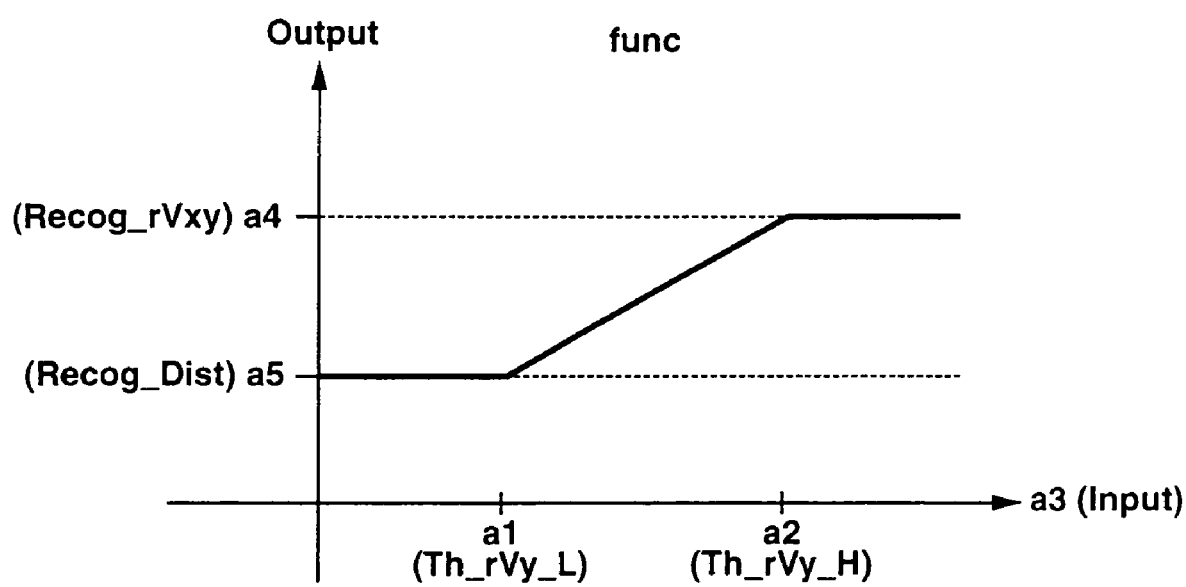
FIG. 6 is a map view representing a characteristic of a function func.

In equation (7), Th_rvy_L and Th_rvy_H denote appropriate threshold values to determine a weight of obstacle determining method. In equation (7), func(a1, a2, a3, a4, a5) denotes a function having a characteristic represented by FIG. 6. When a longitudinal relative velocity becomes small, a more importance is placed on a calculation result of equation (6). When the longitudinal relative velocity becomes large, the more importance is placed on a calculation result of equation (5).

After contact possibility Rprob[i] to the host vehicle for each of the detected objects is calculated, obstacle detection device 5 selects only one object of the highest object from among the objects corresponding to the calculation results of Rprob[i] for all detected objects which are equal to or higher than a predetermined value, the selected object having the ID number assigned to a flag slct. If all of Rprob[i] are not equal to or higher than the predetermined value, i.e., no obstacle is present, flag slct is set to −1 (slct=−1). It is noted that when obstacle detection device 5 determines that the object is smaller than a predetermined size and is a stopped object from the size of the object detected by scanning type laser radar 1, obstacle detection device 5 does not select the object as the most noticeable object. Thus, since laser radar 1 separates the background from the object(s) before the image processing is carried out, obstacle detection device 5 can more positively prevent an erroneous image tracking of an (unnecessary) object such as a scenery (or the background).

Referring back to FIG. 3A, at step 204, obstacle detection device 5 determines a status of an image tracking flag IP_Tracking. This flag of IP_Tracking is set to "1" if the object tracking (or the object pursuit) through the image processing is carried out and is reset to "0" if no object tracking through the image processing is carried out. If IP_Tracking is zero (IP_Tracking=0) (No) at step 204, the routine goes to a step 205. If IP_Tracking is one (IP_Tracking=1) (Yes) at step 204, the routine goes to a step S211. At step 205, obstacle detection device 5 determines whether flag slct is smaller than zero (slct<0) as the result of step S203 (the noticeable object was not present). If slct<0 (No) at step 205, the routine goes to a step 224. If slct>0 (Yes), the routine goes to a step 206. At step 206, obstacle detection device 5 sets an image processing region on the basis of the position of the object selected at step 203: R(Px_$z_o$[slct], Py_$z_o$[slct]).

$$\text{disp\_obj\_}YA = y_0 + (focusv*CAM\_h2/Py\_z_o[slct]) \quad (8).$$

$$\text{disp\_obj\_}YB = y_0 + (focusV*CAM\_h/Py\_z_o[slct]) \quad (9).$$

$$\text{disp\_obj\_}XL = x_0 + (focusH/Py\_z_o[slct]*Px\_z_o[slct]) + (focusH*wide/Py\_z_o[slct]) \quad (10).$$

$$\text{disp\_obj\_}XR = x_0 + (focusH/Py\_z_o[slct]*Px\_z_o[slct]) + (focusH*wide/Py\_z_o[slct]) \quad (11).$$

In equations (8) through (11), disp_obj_** denotes coordinate values of ends of a rectangular region in which the image processing is carried out, disp_obj_YA denotes image coordinate values of upper ends of the rectangular region, disp_obj_YB denotes those of lower ends of the rectangular region, disp_obj_XL denotes those of left side ends of the rectangular region, and disp_obj_XR denotes those of right side ends of the rectangular region. In addition, yO denotes a longitudinal coordinate [pix] of a vanishing point and xO denotes a lateral coordinate [pix] of the vanishing point (parameters determined according to a mount position and a direction of the camera), focusV denotes a focal length [pix] of a vertical direction of the camera which is pixel converted, focusH denotes a focal length [pix] of a horizontal direction of the camera which is pixel converted, and, if a light receiving surface is a square lattice, focusV=focusH (focus V and focusH are parameters determined according to an angular field of view of the camera and a resolution of light receiving elements). Furthermore, CAM_h denotes a height of mounting the camera (unit is a meter), CAM_h2 is a subtraction value of a height (obj_H) of the object to be considered as an obstacle candidate from CAM_h, and wide can be derived from the following equation (12).

$$\text{wide} = focusH/Py\_zo * \{(Rw[slct] + Rx\_vari + Rw\_vari)/2\} \quad (12).$$

In equation (12), Rw[i] denotes a width of the object whose ID number is I in the object group detected by laser radar 1, Rx_vari denotes a detection accuracy on a lateral position of laser radar 1 (a standard deviation [m]), and Rw_vari denotes a detection accuracy on a width of laser radar 1 (the standard deviation [m]). It is noted that, in the first embodiment, the scanning type laser radar 1 is used so that the width of the detected object can be obtained. However, in a case of a millimeter wave radar which is robust in a bad weather or in a case of an extremely inexpensive multi-beam type laser radar, the width of the detected object cannot be obtained. In this case, a value [pix] half of the width [m] determined according to a sum of the detection accuracy (standard deviation [m]) on the lateral position of the laser radar and a maximum width of the object to be considered as the obstacle which is pixel converted may be used in place of above-described equation (12).

At the next step 207, obstacle detection device 5 derives an edge image according to a sobel filter calculation for the image processing region set at step 206 (sobel filter method is a calculation method to drive a change in a gradation between adjacent pixels and can collect only parts where the change in the gradation is large as boundaries between a road and the vehicle in the image) (this edge image derivation corresponds to the first technique).

At step 208, obstacle detection device 5 searches for a lateral edge which is interposed between a longitudinal edge pair (called, a letter H shaped edge) from the edge image at step 207. If H shaped edge is present (Yes) at step 208, the routine goes to a step 209. If no H shaped edge is present (No) at step 208, the routine goes to a step 210. At step 209, obstacle detection device 5 calculates a width Iw (unit is meter) of an object detected by the image according to the following equation (13) on the basis of an interval of the longitudinal edge pair (a left side longitudinal edge and a right side longitudinal edge of the H shaped edge) and the distance of the laser radar detected object. Then, the routine goes to a step 217.

$$Iw = EdgeWidth * Py\_z_o[slsct]/focusH \quad (13)$$

In equation (13), EdgeWidth denotes a pixel interval of the longitudinal edge pair of the H shaped edge. Thus, the connection between the longitudinal edge pair and the radar position is made so that the monocular camera can calculate the distance.

At step 210, obstacle detection device 5 remains unchanged from IP_Tracking flag=0 (lost) and the routine goes to step 224. At step 211, obstacle detection device 5 determines a status of an image processing flag IP_State. If the present image tracking processing is carried out through the edge detection processing (namely, IP_State=1), the routine goes to a step 212. If the image tracking processing is carried out through a pattern matching (namely, IP_State=0) (Yes) at step 211, the routine goes to a step 213.

At step 212, obstacle detection device 5 sets the region in which the image processing is carried out at the present sampling period and which is rather narrower according to equations (14) through (17) since the image processing at the previous sampling has been carried out with the high accuracy through the edge detection.

$$disp\_obj\_YA = y_0 + (focusV * CAN\_h2/iPy\_z_1) \quad (14)$$

$$disp\_obj\_YB = y_0 + (focusV * CAM\_h/ipy\_z_1) \quad (15)$$

$$disp\_obj\_XL = x_o + (focusH/iPy\_z_1 * iPx\_z_1) - wide2 \quad (16)$$

$$disp\_obj\_XR = x_0 + (focusH/iPy\_z_1 * iPx\_z_1) + wide2 \quad (17)$$

In equations (14) through (17), $iPy\_z_1$ and $iPx\_z_1$ represent longitudinal position [m] and lateral position [m] of the object to be detected by the image processing at the previous sampling and wide2 is half [pix] the width in the image processing region determined from the following equation (18).

$$wide2 = iW\_z_1/2 + w\_narrow \quad (18)$$

In equation (18), $iW\_z_1$ denotes a pixel value of the object width detected through the image processing at the previous sampling period (an interval of longitudinal edge pair) and w_narrow denotes a maximum value of the position of the object which varies for one sampling period.

At step 213, obstacle detection device 5 sets the region in which the image processing is carried out at the present sampling rather widely according to the following equations (19) through (22) since the image processing at the previous sampling period is carried out by the pattern matching.

$$disp\_obj\_YA = y_0 + (focusV * CAM\_h2/iPy\_z_1) \quad (19)$$

$$displ\_obj\_YB = y_0 + (focusV * CAM\_h/iPy\_z_1) \quad (20)$$

$$displ\_obj\_XL = x_0 + (focusH/iPy\_z_1 * iPx\_z_1) - wide3 \quad (21)$$

$$displ\_obj\_XR = x_0 + (focusH/iPy\_z_1) + wide3 \quad (22)$$

In equations (19) through (22), wide3 denotes a half [pix] the width in the image processing region determined according to the following equation (23).

$$wide3 = iW\_z_1/2 + w\_narrow + w\_PM\_err \quad (23)$$

In equation (23), w_PM_err denotes a value of a presumed value of a positional error, with the detection accuracy of the object according to the pattern matching taken into account and which is pixel converted.

At a step 214, obstacle detection device calculates the edge image through sobel filter calculation for the image processing area set at step 212 or step 213. At a step 215, obstacle detection device 5 collects candidates of the longitudinal edge pair from the edge image determined at step 214. If any candidate of the longitudinal edge pair is present (Yes) the routine goes to a step 216. If no candidate of the longitudinal edge pair is present (No) at step 215, the routine goes to a step 219.

Then, at step 216, obstacle detection device 5 selects one couple of the longitudinal edge pair located at a lowest position of the image if the longitudinal edge pair is present in plural which are collected at step 215 (in a case where the longitudinal edge pair is present only one pair, this pair is used). Then, obstacle detection device 5 calculates the position to the detected object according to the following equations (24) and (25).

$$iPy\_z_o = (focusV * Iw)/EdgeWidth \quad (24)$$

$$iPx\_z_o = (((SideEdge\_P + SideEdge\_L)/2) - x_o) * iPy\_z_o/focusH \quad (25)$$

In equation (25), SideEdge_R denotes a lateral position of the right side longitudinal edge at the longitudinal edge pair, SideEdge_L denotes a lateral position of the left side longitudinal edge in the longitudinal edge pair, and the following relationship is established as EdgeWidth=SideEdge_R−SideEdge_L.

At step 217, obstacle detection device 5 stores the image region based on the position of the longitudinal edge pair as a reference pattern. At a step 218, obstacle detection device sets image tracking flag as follows; IP_Tracking=1, and sets the image processing flag as follows: IP_State=1, and the routine goes to step 224.

On the other hand, at step 219, obstacle detection device 5 performs the pattern matching using the last stored reference pattern for a region having a magnitude equal to or larger than the image processing region set at step 213 (this corresponds to the second technique). The size of the image processing region may be widened as the yaw rate of the host vehicle becomes large or as the acceleration/deceleration of the host vehicle (can be detected by a longitudinal G (gravity) sensor of a body of the host vehicle) becomes large.

At step 220, obstacle detection device 5 advances to a step 221 if the pattern matching is succeeded. If not succeeded (No), the routine goes to a step 223. The success of the pattern matching is such that a correlated value of the image processing region to a reference template is higher than a predetermined value.

At a step 221, obstacle detection device 5 derives a center coordinate (longitudinal direction; TmplMat_Row and lateral direction; TmplMat_Column) of the region at which the correlated value becomes maximum through the pattern matching at step 220 and calculates the position to the detected object according to equations (26) and (27) as will be described below:

$$iPy\_z_o = (focusV*CAM\_h)/(TmplMat\_Row - y_o) \quad (26)$$

$$iPz\_z_o = (TmplMat\_Column - x_0)*iPy\_z_o/focusH \quad (27).$$

At a step 222, obstacle detection device 5 sets image tracking flag as IP_Tracking=1 and zeroes image processing flag as IP_State=0 and the routine goes to step 224. On the other hand, at step 223, obstacle detection device 5 resets image tracking flag IP_Tracking to "0" (IP_Tracking=0) and the routine goes to step 224. At step 224, obstacle detection device 5 updates the past value related to the position of the object and, then, the present routine is ended.

That is to say, the obstacle detection apparatus in the first embodiment enables the robust tracking of the same object through the image processing with the high accuracy even if the radar is trapping the object by switching a combination between the edge detection and the pattern matching according to the situation. A high level obstacle detection system by means of a fusion can be achieved.

[Image Processing Technique Selective Control Action]

As described in the SUMMARY OF THE INVENTION, in previously proposed obstacle detection apparatuses disclosed in the Japanese Patent Application First Publications No. 2002-117392 and Heisei 11-44533, a sensor of the system to be referenced is always the laser radar.

In details, during the trapping through the radar, retrieval of a correspondent relationship between the radar detected position and a preceding vehicle characterizing region photographed on the image and the characterizing region restored as the reference pattern are carried out. Therefore, during the radar trapping (since the process in the monocular camera is such that only the preparation is made for the object lost in the radar), the position of the preceding vehicle through the image processing cannot be detected. That is to say, a more highly accurate positional detection through the image processing during the detection of the radar cannot be obtained. In addition, since, in a short (close) distance (10 meters or shorter), the object within the radar angular field of view≈the object placed in a front face of the host vehicle, the detection accuracy in the lateral position is not important. Therefore, an error in the lateral position of the radar is not considered. Then, the lateral position is not accurately detected through the image processing. However, in a remote (long) distance (10 meters or longer), the detection accuracy at the lateral position is remarkably important to derive a possibility that the detected object provides the obstacle for the vehicle. That is to say, even if the lateral positional error of the laser detected object is present, it is necessary to be enabled to detect the lateral position of the object accurately from the image processing and, further, to continue to track the object by means of the camera even during the trapping by the radar. Next, problem points of each of the above-described previously proposed objection recognition apparatuses will be described below.

p1) Each previously proposed obstacle detection apparatus does not consider an effect of a distance measurement error (ranging error) of the radar on the image processing. In details, since, for the detected position of the radar the error, in general, easily occurs in the lateral (vehicular width) direction, there occurs the possibility that the background is included within the reference pattern if the reference pattern of the preceding vehicle is prepared from the image region corresponding to the radar detected position. In this case, since the correlation to the background not to the preceding vehicle becomes highest, there is a possibility that the background is erroneously tracked considering that the background is deemed to be the preceding vehicle.

p2) In a case where the object is moved to an outside of the angular field of view of the radar, a last state of the radar for a long term until the object is returned to an inside of the angular field of view. Since, during this term, the reference pattern is not updated, a viewing of the object during the traveling of the host vehicle is changed due to a variation of a relative position of the object to the host vehicle, an illumination change, and so forth so that the correlation to the reference pattern becomes low and there is a possibility that the preceding vehicle cannot be tracked.

p3) During the radar trapping, the reference pattern is updated so that the image coordinates have the relation to the radar detected position. Therefore, in a case where the radar is detecting the object, a positional accuracy of the object detected through the image processing is not in excess of the positional accuracy of the object detected through the radar.

p4) Even during the object lost of the radar tracking, in the pattern matching, the region having a high correlation value is updated as a new reference pattern so that it may be considered that an improvement in a tracking performance of the preceding vehicle is made. In this case, there is a possibility that a slight amount of the background is included within the reference pattern when the reference pattern is updated. Then, this is repeated so that a large quantity of the background is gradually included within the reference pattern. Hence, there is a possibility that the background is erroneously tracked as the preceding vehicle.

On the other hand, in the first embodiment, i)-① in a case where the image tracking flag (IP_Tracking) is not under the tracking (namely, the object is not trapped (or detected)), in the flowchart of FIGS. 3A, 3B, and 4, such a flow as step 201→step 202→step 203→step 204 (step 205 (step 206 (step 207 occurs. That is to say, at step 206, obstacle detection device 5 assumes the camera image region corresponding to the position of the object for the host vehicle to be noticed from among the detected objects by means of the radar as a noticeable region and, at step 207, detects (extracts) the object through the edge detection (the position of the object that can accurately be detected, namely, the technique for the background to be difficult to be included).

i)-② In a case where the image tracking flag is under the tracking (in a case where the object is under the trapping), in the flowchart shown in FIGS. 3A, 3B, and 4, such a flow as step 201 (step 202 (step 203 (step 204 (step 211 (step 212 (or step 213)→step 213→step 214 occurs. That is to say, at step 212(213), obstacle detection device 5 assumes the camera image region corresponding to the position of the object for the host vehicle to be noticed from among the detected objects by means of the radar as a noticeable region and, at step 214, detects (extracts) the object through the edge detection (the position of the object that can accurately be detected, namely, the technique for the background to be difficult to be included).

ii) In a case where the object has been detected by means of the edge detection, such a flow as step 201→step 202→step 203→step 204→step 211→step 212 (213)→step 213→step 214→step 215→step 216→step 217→step 218 occurs. That is to say, at step 217, obstacle detection device 5 stores the detected region as the reference pattern. However, at step 218, the image processing flag is the edge detection and the pattern matching is not carried out.

iii) In a case where the object cannot be detected through the edge detection, step 201→step 203→step 204→step 211→step 212 (213)→step 213→step 214→step 215→step 219→step 220 occurs. That is to say, at step 219, the pattern matching serves to detect the position of the object on the basis of the correlation between the reference pattern stored at the last time and the input image from CCD camera 3. However, the reference pattern is not updated.

The above-described items of i)→ii)→iii)→i)→ii)→ are repeated. In the pattern matching at item iii), the rate of the background occupied in the reference pattern is very minor so that a more robust tracking can be carried out and the problem item p1) can be solved.

In the case of item ii), a reference template is updated in the case where the position of the object could correctly be detected. Hence, a failure in the tracking of the preceding vehicle due to the change in the viewing of the object during the travel of the vehicle, namely, the problem of p2) can be solved.

In a case where the detection of the object by means of the edge detection described in i)-② is completed, the object can be detected only through the image processing irrespective of the radar information. Hence, in a case where the radar and the image processing are trapping the same object, the image processing can detect the position (especially, the position in the lateral direction) of the object with a higher accuracy than the radar so that the problem item p3) can be solved.

The detection of the object through the pattern matching is carried out together with the object detection through the edge detection and is continued until the detection of the object by means of the edge detection is ended without updating of the reference pattern. (iii)→i)-② (i) (iii). Thus, the erroneous tracking to the background due to the gradual inclusion of the background within the reference pattern, namely, the problem p4) can be solved. Next, the advantages that the obstacle detection apparatus provides will be described below.

Since, only if the object detection by means of the edge detection has failed and when the object detection through the pattern matching is carried out, it becomes possible to be compatible between the improvement in the positional accuracy of the object detection and a robustness in the object tracking (pursuing). Since, in a case where the edge detection permits the object to be detected, the reference pattern used in the pattern matching is updated, the failure in the tracking of the preceding vehicle due to the change in the viewing during the vehicular travel and the erroneous tracking to the background due to the gradual inclusion of the background within the reference pattern can be solved. In addition, since the reference pattern is updated but the pattern matching is not carried out, a high speed image processing can be achieved. In a case where the object is trapped through the pattern matching, the object detection through the edge detection is used together with the pattern matching and the object detection is continued through the pattern matching without updating of the reference pattern until the object detection through the edge detection has succeeded. Hence, the erroneous tracking to the background due to no updating of the pattern and due to the gradual inclusion of the background within the reference pattern can be prevented. After the object tracking through the pattern matching is carried out, a search region of the object in the object detection through the edge detection is searched over a wide range than an ordinary case (in which the object is continuously detected according to an object detection through the edge detection). The pattern matching is carried out after the object detection through the edge detection has failed. Hence, even through the object is tried to be detected from the region of the same size at a time at which the object detection through the edge detection has continuously been succeeded, there is a possibility that the object is forced out of the search region. In this way, even if the object detection caused by the edge detection has failed, the search region is widened so that the noticeable object is within the search region. Hence, it is easy to extract the object through the edge extraction. While the object is continuously detected through the edge detection, the lowest positioned characterizing quantity is selected if the characterizing quantity to be extracted is present in plural. This prevents the erroneous detection in a case, for example, where the same characterizing quantity is developed from the background. In addition, as another example, in a case where another preceding vehicle which is traveling ahead of the preceding vehicle has a larger size than the preceding vehicle, the trapping of the other preceding vehicle due to a clearer appearance of the characterizing quantity than the preceding vehicle rather than the trapping of the preceding vehicle can be prevented.

(Second Embodiment)

A second preferred embodiment of the object recognizing apparatus according to the present invention will be described below. In the first embodiment, a basic concept is that a highly accurate and robust tracking are carried out through the image processing during the object detection through the radar. However, in the second embodiment, in addition to this, the image processing is improved to constitute further practical image processing system. It is noted that since the structure of the second embodiment is generally the same as those shown in FIG. 2, the detailed description will herein be omitted. Next, an operation of the second embodiment will be described below.

[Image Processing Technique Selective Control Process]

FIGS. 7A, 7B, 8, and 9 are integrally a flowchart representing the flow of the tracking object selection control process. It is noted that the same step numbers as the first embodiment shown in FIGS. 3A, 3B, and 4 are the same contents and detailed description thereof will be omitted herein.

At a step 301, obstacle detection device 5 reads a flag Rstp[i] representing whether the radar detected object is a stopped (stationary) object in addition to the contents of step 201 described in the first embodiment. At a step 311 shown in FIG. 7B, obstacle detection device 5 determines whether the object tracked (pursued) through the image processing is a stopped object. If it is the stopped object (Yes) at step 311, the routine goes to a step 312. If not stopped object (No) at step 311, the routine goes to a step 313.

At step 312, obstacle detection device 5 calculates a correction quantity between one sampling period caused by a host vehicle motion from the following equations (28) and (29).

$$\theta yaw = Yr * Ts \quad (28).$$

$$CompLat = \theta yaw * (Cpix/Cangle) \quad (29).$$

In equations (28) and (29), Yr denotes an output value of yaw rate detecting device (yaw rate sensor) 7B (a clockwise direction=positive) mounted in the host vehicle, Ts denotes the sampling period, in the second embodiment, of 33 milliseconds, Cpix denotes the number of horizontal effective pixels of CCD camera 3, and Cangle denotes a horizontal angular field of view of CCD camera 3. In the second embodiment, only a yaw angle is corrected. However, in the same way, a pitching angle may be corrected. At step 313, obstacle detection device 5 clears the correction quantity in accordance with the following equation (30) to zero.

$$CompLat=0 \qquad (30).$$

At step 315, in the same way as step 212, obstacle detection device 5 changes disp_obj_XL and disp_obj_XR described in equations (16) and (17) to the following equations of (31) and (32).

$$disp\_obj\_XL = x_0 + (focusH/iPy\_z_1 * iPx\_z_1) - wide2 - CompLat \qquad (31).$$

$$disp\_obj\_XR = x_0 + (focusH/iPy\_z_1 * ipx\_z_1) + wide2 - CompLat \qquad (32).$$

At step 316, obstacle detection device 5 changes disp_obj_XL and disp_obj_XR described in equations (21) and (22) to the following equations of (31) and (32).

$$disp\_obj\_XL = x_0 + (focusH/iPy\_z_1 * iPx\_z_1) - wide3 - CompLat \qquad (33).$$

$$disp\_obj\_XR = x_0 + (focusH/iPy\_z_1 * iPx\_z_1) + wide3 - CompLat \qquad (34).$$

Since steps 317, 318, and 319 are the same contents as steps 214, 215, and 216 described in the first embodiment, the detailed description thereof will herein be omitted.

At a step 320, obstacle detection device 5 executes the same process at step 217 described in the first embodiment in a case where EdgeWidth is smaller than a predetermined value and stores the reference pattern in such a manner that the reference pattern is not in excess of a predetermined size vertically and horizontally from a center coordinate (SideEdge_R+SideEdge_L)/2 of the edge pair in a case where EdgeWidth is larger than the predetermined value. It is noted that, although the reference pattern described herein is widened to a square from its center, the reference pattern may be such a shape that a length in the longitudinal direction is larger than that in the lateral direction or vice versa according to a shape of the detected object.

At a step 321, the same contents of step 218 in the first embodiment are carried out. However, in the first embodiment, after setting various flags, the updating of the past value is carried out and the present routine is ended. On the other hand, in the second embodiment, after step 321, the routine goes to a step 327. At a step 325, the same contents of step 222 in the first embodiment are carried out. However, in the first embodiment, after setting the various flags, the updating of the past values is carried out and the present routine is ended. On the other hand, in the second embodiment, after step 325, the routine goes to a step 327. At step 327, obstacle detection device 5, through a time differentiation on the position of the image tracking object, calculates a motion of the object=a relative velocity vector of the moving object to the host vehicle (a lateral direction relative velocity: $i\_rVx\_z_o$, longitudinal direction relative velocity: $i\_rvy\_z_o$) according to a transfer function expressed in the following equation (35).

$$G(z)=(cZ^2-C)/(Z^2-aZ+b) \qquad (35).$$

In equation (35), Z denotes an advance operator, coefficients a, b, and c denotes positive numbers and these are discrete values, for example, by the sampling period of 33 milliseconds to provide a desired pseudo differentiation characteristic.

At a step 328, obstacle detection device 5 determines whether the tracking object through the image processing is the stopped object according to the following equation (36) and its result is substituted into image tracking object stopped object flag Istp.

$$if\{abs(i\_rVx\_z_o)<Th\_rVx\_stp \text{ and } \\ abs(i\_rvy\_z_o\_Vsp)<Th\_rvy\_stp\}Istp=1 \\ else\ Isp=0 \qquad (36).$$

In this equation, abs(A) means a function to output an absolute value of A (A is a head character of Argument), if (expression) statement1 else statement2 is a function to execute statement1 if expression is satisfied and to execute statement2 if expression is not satisfied. In addition Vsp denotes the vehicle speed of the host vehicle, and Th_rVx_stp and Th_rvy_stp denote threshold values determined according to coefficients a, b, c, of equation (35), the angular field of view and pixels of CCD camera 3. Furthermore, immediately after the object detection (after the initial extraction) through the image processing, Istp=Rstp[slct].

At a step 328, obstacle detection device 5 determines whether according to a status of image processing flag IP_State the image tracking processing is carried out through the edge detection process. If IP_State=1 (Yes) at step 328, the routine goes to a step 331. If IP_State=0 (No) at step 328, the routine goes to a step 329. At step 329, obstacle detection device 5 determines whether a motion (movement) of the image tracking object (the object which is tracked through the image processing) is abrupt to a degree such that either one or both of the following equations (37) and (38) are satisfied.

$$abs(i\_rVx\_z_o-i\_rVx\_z_1)>Th\_rVx\_abn \qquad (37).$$

$$abs(i\_rVy\_z_o-i\_rVy\_z_1)>Th\_rVy\_abn \qquad (38).$$

Figure 8:
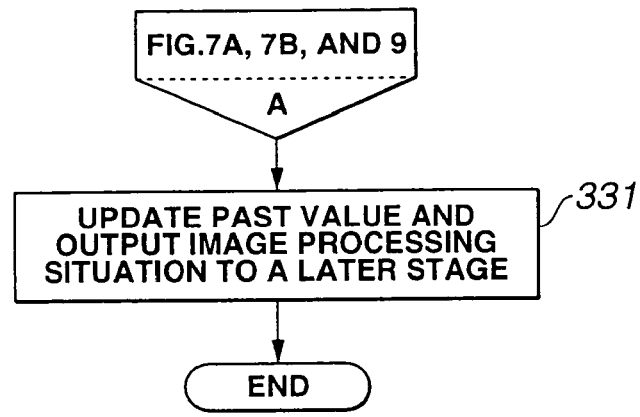
FIG. 8 is a part of the flowchart representing the flow of the image processing technique selective control procedure executed in a second preferred embodiment according to the present invention.
Figure 9:
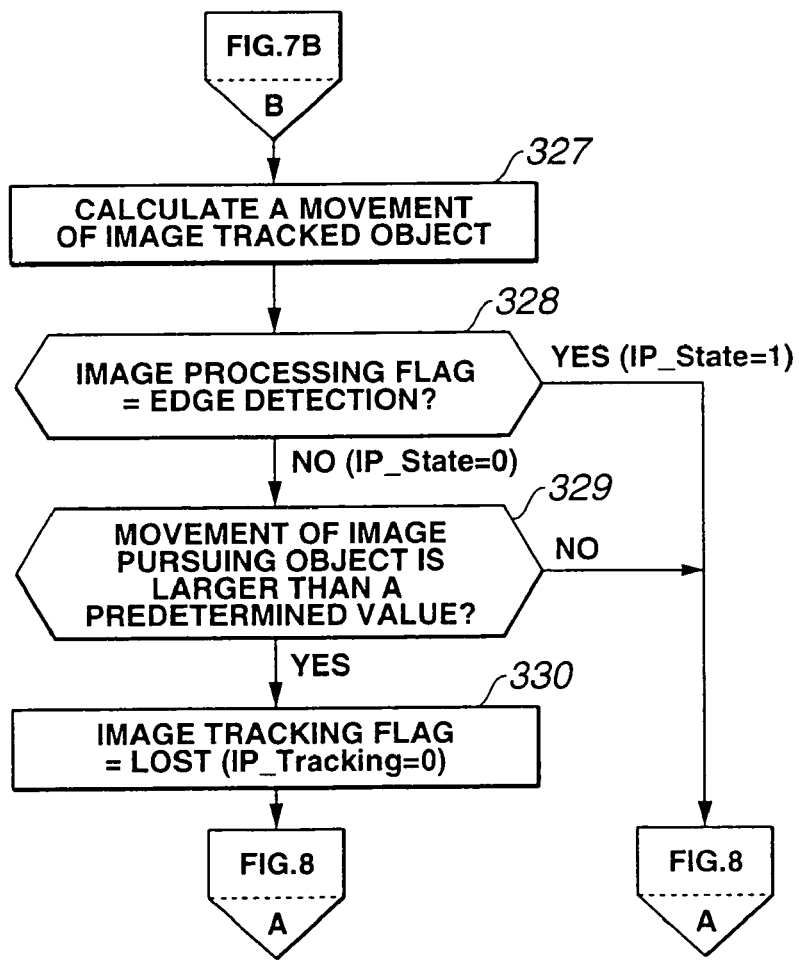
FIG. 9 is a part of the flowchart representing the flow of the image processing technique selective control procedure executed in a second preferred embodiment according to the present invention.

In equations (37) and (38) Th_rVx_abn and Th rVy abn denote threshold values at which the motion of the object at a time interval between one sampling period is allowed as a change in the motion (relative velocity). The threshold values may be more precise in such a way that these threshold values become larger according to the yaw rate of the host vehicle and according to a magnitude of the vehicular acceleration/deceleration. If the motion of the image processing object is abrupt (Yes) at step 329, the routine goes to a step 330. If it is not abrupt (No) at step 329, the routine goes to step 331. At step 330, image tracking flag IP_Tracking is reset to zero (IP_Tracking=0) and the routine goes to step 331. Referring to FIG. 8, at step 331, obstacle detection device 5 executes not only the same contents of step 224 described in the first embodiment (updating of the past value) but also the output of the image processing situation to a later stage in a form of the following equation (39). Image Processing Situation to be outputted to the later stage=IP_Tracking * (IP_State+1) (39). As an output form of equation (29), 0 is outputted to the later stage in a case where the image tracking cannot be carried out, 1 is outputted to the later stage in a case where the image tracking is carried out through the pattern matching, and 2 is outputted to the later stage in a case where the image tracking is carried out through the edge detection.

That is to say, in the second embodiment, such a system as will be described below can be structured. The system can be constituted by a pattern matching reinforcement function including the function (step 330) to prevent the erroneous tracking to the background, the function (step 320) to prevent a reduction in a processing speed by limiting a size of the reference template for a close distance object having a large area on the image, a host vehicle motion correction function (step 312) not to give an ill influence on the correction by limiting the correction of an image processing range due to the motion of the host vehicle only for the stopped object whose motion on the image screen becomes large and a function (step 331) to output the image processing situation to the later stage.

Next, advantages of the obstacle detection apparatus in the second embodiment will be described below.

Since, in a case where the detection of the object through the edge detection is possible, the size of the pixels of the reference pattern to be updated is limited according to the approaching distance between the vehicle and the object. Hence, without the inclusion of the background in the inside of the reference pattern, the size of the region in which the reference pattern is stored is narrowed down to a part of the detected object or the pixel size of the detected object is resized to a predetermined pixel size. (For example, even if the size of the object detected through the edge detection is 20 pixels in the longitudinal direction x 20 pixels in the lateral direction, each pixel in the longitudinal direction and each pixel in the lateral direction are respectively omitted (thinned out) so as to be stored (or recorded) as the reference pattern in a case where there is a limitation on the size of the longitudinal direction of 10 pixels x lateral direction of 10 pixels. At this time, a magnification of the thinned-out is simultaneously stored. Therefore, when the pattern matching is thereafter carried out, the reference template is returned to 20×20 pixels. It is natural that a brightness information is only 10×10 pixels. A correlation calculation is carried out for a part having the information.) This permits the processing time required when the pattern matching to be suppressed to a predetermined time or shorter.

In a case where the detection of the object through the pattern matching is carried out and a variation in time of the detected position is equal to or larger than a predetermined magnitude, the image tracking flag is zeroed and the object detection is forcibly stopped. Hence, if an erroneous tracking of the background such as a road surface should be carried out, this erroneous tracking can be stopped in an extremely short time.

When the image processing region is determined, the region in which the image processing is carried out only in a case where the noticeable object is the stopped object is corrected according to the motion of the host vehicle. Consequently, the ill influence of correcting the image processing region according to the motion of the host vehicle is eliminated and the effect of the correction can positively be achieved. The ill influence of the correction of the image processing region according to the motion of the host vehicle will be described below. For example, in a case where a steering variable (quantity) of the host vehicle (a yaw angular correction rate (quantity)) is larger than a predetermined variable (quantity), suppose such a case where the image processing region is corrected on the basis of a yaw angular variation. Suppose such a scene that the preceding vehicle is lane changed at the same timing as the host vehicle is lane changed at the same timing as the host vehicle from a left side lane to a right side lane. In this scene, the image processing region is corrected to be deviated toward a left side (relatively) of the image scene along with the right side lane change of the host vehicle. However, since the preceding vehicle is moved toward the right side, the preceding vehicle does not enter the image processing region corrected so as to be deviated toward the left side. Consequently, the preceding vehicle cannot be detected (If not corrected, no problem occurs). Then, the correction is carried out only if the preceding vehicle is determined to be stopped vehicle so that a more positive narrowing of the image processing region can be achieved.

The information of the present image processing situation is distinguishably outputted to the later stage according to cases where the object position can be detected through the edge detection, the object position can be detected through the pattern matching, and the object position cannot be detected through either of the techniques. As described above, since the edge detection and the pattern matching techniques have respective merits and demerits, for example, in a case where the later stage processing is changed on the basis of the information on the accuracy of the detected position information, the accuracy of the detected position information can be determined without carrying out a new processing.

(Third Embodiment)

Figure 10A:
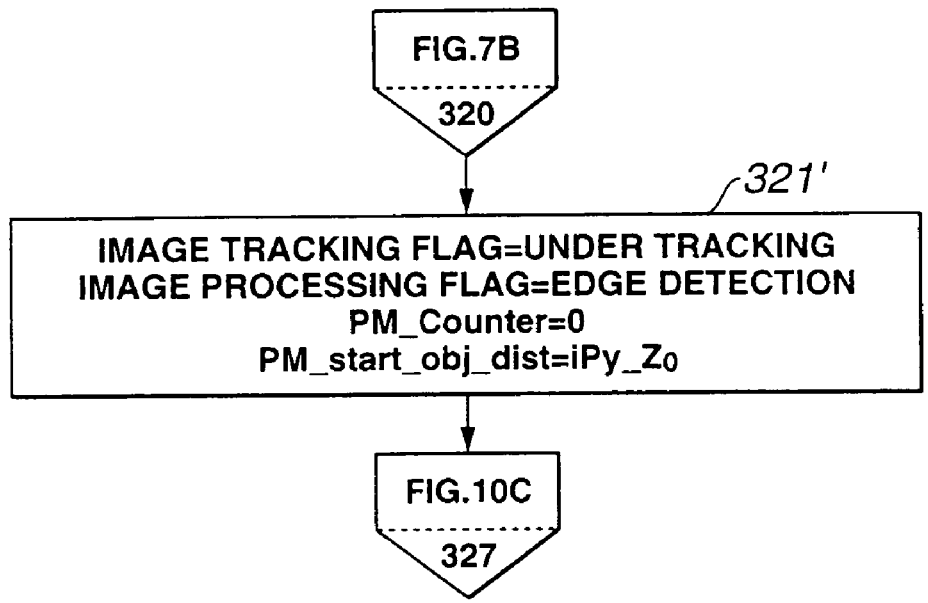
FIGS. 10A, 10B, and 10C are parts of the flowchart executed in a third preferred embodiment of the obstacle detection apparatus according to the present invention.
Figure 10B:
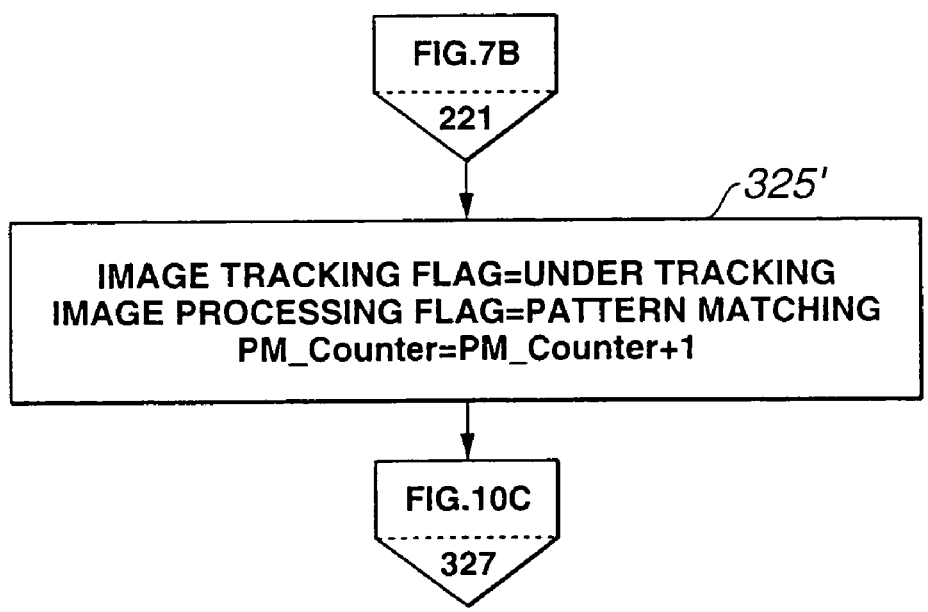
Figure 10C:
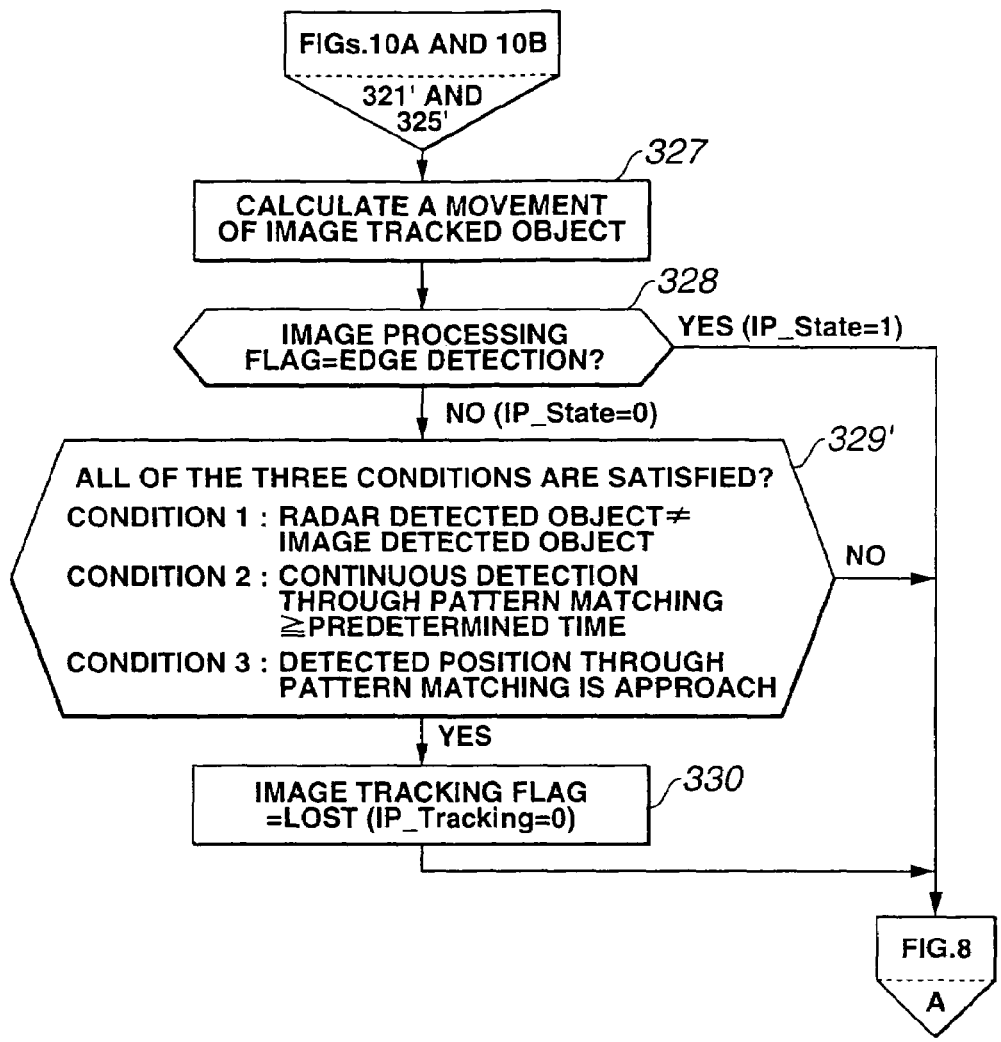

FIGS. 10A, 10B, and 10C show a third preferred embodiment of the obstacle detection apparatus according to the present invention. The other parts of the flowchart shown in FIGS. 10A, 10B, and 10C are the same as that described in the second embodiment with reference to FIGS. 7A, 7B, and 8. That is to say, at a step 321' shown in FIG. 10A, obstacle detection device 5 carries out the same process at step 321 described in the second embodiment and carries out new variable settings as described below. That is to say, a pattern matching continuation time: PM_Counter=0 (clear to zero) and a pattern matching start distance: PM_start_obj_dist=iPy_$z_o$ (reset to the position calculated at the edge detection). Then, at a step 325' shown in FIG. 10B, obstacle detection device 5 carries out the same process at step 325 described in the second embodiment carries out a new variable setting as described below. Pattern matching continuation time: PM_Counter=PM_Counter+1 (one increment of the counter value by one sampling period). Then, at a step 329' shown in FIG. 10C, if all of the three following conditions are satisfied, the routine goes to step 330. If not satisfied (No) at step 329', the routine goes to step 331. The three conditions are radar detected object≠image detected object, PM_Counter≧Th_UpDn1, and PM_start_obj_dist−ipy_$z_o$≧Th_UpDn2. It is noted that Th_UpDn1 denotes a value of a response time of a later stage vehicular run control actuator divided by an image processing period (sampling period) (for example, in a case where the actuator having the response time of 0.5 seconds [s] is used and the image processing period is 33 milliseconds, Th_UpDn1 ≈15). In a case where the actuator to perform the collision avoidance is selectively determined in accordance with a traveling situation (the actuator is changed in accordance with a surrounding traveling situation such as a case where a steering actuator is used to steer the vehicle to avoid the collision against the object and as a case where a brake actuator is used to brake the vehicle to avoid the collision against the object, the response time may be changed according to the actuator used. In addition, Th_UpDn2 denotes a threshold value to determine an erroneous tracking to the background from how long the object is approaching to the host vehicle and may be set to a length corresponding to be equal to or longer than one generally available vehicle whole length without any problem. Strictly, Th_UpDn2 may be set as follows: Th_UpDn2=max(whole length of a generally available vehicle [m], response time of the actuator used [s]× vehicle speed of the host vehicle [m/s]), wherein max(A, B) denotes a function which selects one of both of A and B which is smaller than the other. Furthermore, ipy_$z_o$ means the position of the object detected by the present pattern matching. It is noted that, as an alternative to step 329' described above, either if the contents of step 329 described in the second embodiment are satisfied or if the conditions at step 329' are satisfied, the routine may go to step 330 and, if neither is satisfied (No), the routine may go to step 331 described in the second embodiment.

(Fourth Embodiment)

Figure 11:
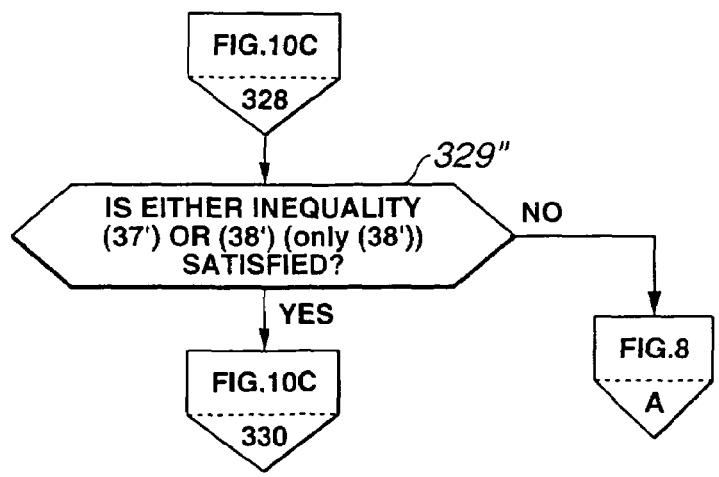
FIG. 11 is a part of the flowchart executed in a fourth preferred embodiment of the obstacle detection apparatus according to the present invention.

FIG. 11 shows a part of the flowchart in a case of a fourth preferred embodiment of the obstacle detection apparatus according to the present invention. The other parts of the flowchart shown in FIG. 11 are generally the same as those shown in FIGS. 7A, 7B, 8, and 9 described in the second embodiment. At a step 329", obstacle detection device 5 determines whether either inequality of (37') or (38') is satisfied. If satisfied (Yes) at step 329" the routine goes to step 330. If not satisfied (No) at step 329", the routine goes to step 331.

$$abs(iPx\_z_o - iPx\_z_1) > Th\_Px\_abn \quad (37'),$$

wherein Th_Px_abn=abs(iPx_$z_{o-est}$_iPx) and est_iPx=iPy_$z_o$ sin(θyaw)+iPx_$z_o$ cos(θyaw), and $$abs(iPy\_z_o - ipy\_z_1) > Th\_Py\_abn \quad (38'),$$

wherein Th_Py_abn=Vsp*Ts.

It is noted that θyaw denotes a multiplication of the yaw rate of the host vehicle with sampling time of Ts, est_iPx denotes an estimated value in the lateral directional position in a case where the yaw rate read at the present sampling period is assumed to be constant until the subsequent sampling period, and Vsp denotes the vehicle speed of the host vehicle. It is also noted that the inequality at step 329" may be only the inequality of (38').

(Other Embodiments)

As described hereinabove, the obstacle detection apparatus in each of the first through fourth embodiments has been explained. However, specific structure of the obstacle detection apparatus according to the present invention is not limited to each of the first, second, third, and fourth embodiments. Various changes and modification may be made without departing from the scope and sprit of the present invention which is defined in the appended claims.

For example, in each of the first through fourth embodiments, the image processing is carried out for only one object. However, in a case where the radar and the image processing are used to detect redundantly a plurality of objects, the similar processing can be repeated to achieve the detections of the objects.

In each of the first through fourth embodiments, the calculation of the lateral position iPx_$z_o$ of the image detected object (detected object through the image processing) is carried out using ipy_$z_o$ in equations (24) and (25). However, in this alternative case, since the calculated value ipy_$z_o$ which is derived from the image whose longitudinal positional accuracy is specifically worsened at a remote (long) distance between the host vehicle and the trapped object is not used but the longitudinal position of the radar whose accuracy is not worsened even in the case of the remote (long) distance, the accuracy of the lateral position in the image can be improved.

In addition, the use of the radar is a prerequisite in each of the first and second embodiment. However, the radar may not be used in a case where the position of the object is directly obtained from the image through a triangulation method using a stereo camera. In this case, it is necessary in a stereo processing to add such a process that the object is discovered and the distance to the object through a stereo image is determined. However, for other processes, the contents of each of the first and second embodiments may directly be applied.

The entire contents of Japanese Patent Applications No. 2003-189616 (filed in Japan on Jul. 1, 2003) and No. 2004-165419 (filed in Japan on Jun. 3, 2004) are herein incorporated by reference. The scope of the invention is defined with reference to the following claims.

What is claimed is:

1. An obstacle detection apparatus for an automotive vehicle, comprising:

an image fetching section that fetches a situation of a forward detection zone in a form of an image;

a noticeable object outputting section that outputs a positional information of an object to be noticeable for the vehicle; and an image processing section that performs an image processing for a region of the image fetching section on the basis of an output of the noticeable object outputting section to detect the object, the image processing section including a first technique mainly to detect the position of the object and a second technique mainly to track the object, the second technique detecting the object when the object detection by the first technique becomes not able to be carried out, wherein the second technique is a pattern matching that performs a tracking of the object from a correlation between a previously stored reference pattern and an output of the image fetching section and wherein the image processing section updates the reference pattern when the object detection by the first technique has succeeded.

2. An obstacle detection apparatus for an automotive vehicle as claimed in claim 1, wherein, in a case where the object is trapped through the pattern matching, the object detection through the first technique is used together with the pattern matching and the object detection is continued through the pattern matching without updating of the reference pattern until the object detection through the first technique has succeeded 3. An obstacle detection apparatus for an automotive vehicle as claimed in claim 1, wherein the image processing section limits a size of the reference pattern updated when the object detection by the first technique is possible in accordance with an approaching distance between the vehicle and the object.

4. An obstacle detection apparatus for an automotive vehicle as claimed in claim 1, wherein the image processing section stops the object detection by the second technique when the object is detected by the second technique and when a positional variation of the detected position is equal to or larger than a predetermined value.

5. An obstacle detection apparatus for an automotive vehicle as claimed in claim 1, wherein the image processing section sets a search region of the object in the object detection by the second technique over a range wider than an ordinary time at which the object is continuously detected by the first technique.

6. An obstacle detection apparatus for an automotive vehicle as claimed in claim 1, wherein the image processing section selects a characterizing quantity located at a lowest position on an image screen when the object detection by the first technique is continuously carried out and when characterizing quantities to be extracted are present in plural.

7. An obstacle detection apparatus for an automotive vehicle as claimed in claim 1, wherein the image processing section corrects the region to be image processed according to a vehicular motion when the region based on the output of the noticeable object outputting section is image processed and when the noticeable object is a stopped object.

8. An obstacle detection apparatus for an automotive vehicle as claimed in claim 1, wherein the image processing section outputs an information of a present image processing situation which is changed according to cases where the object detection is possible by the first technique, the object detection is possible by the second technique, and where the object detection by neither of the techniques is possible.

9. An obstacle detection apparatus for an automotive vehicle as claimed in claim 1, wherein the image processing section stops the object detection by the second technique when the object read out from the noticeable object outputting section is different from that detected by the image processing section, when the object is continuously detected by the second technique for a predetermined time or longer, and when the detected position of the object by the second technique is approaching to the vehicle.

10. An obstacle detection apparatus for an automotive vehicle as claimed in claim 1, wherein the image processing section stops the object detection by the second technique when a variation of the detected position of the object by the second technique is equal to or larger than a threshold value calculated on the basis of a vehicle speed of the vehicle.

11. An obstacle detection apparatus for an automotive vehicle, comprising:
   image fetching means for fetching a situation of a forward detection zone in a form of an image;
   noticeable object outputting means for outputting a positional information of an object to be noticeable for the vehicle; and
   image processing means for performing an image processing for a region of the image fetching means on the basis of an output of the noticeable object outputting means to detect the object, the image processing means including a first technique mainly to detect the position of the object and a second technique mainly to track the object, the second technique detecting the object when the object detection by the first technique becomes not able to be carried out, wherein the second technique is a pattern matching that performs a tracking of the object from a correlation between a previously stored reference pattern and an output of the image fetching means and wherein the image processing means updates the reference pattern when the object detection by the first technique has succeeded.

12. An obstacle detection method for an automotive vehicle, comprising:
   fetching a situation of a forward detection zone in a form of an image;
   outputting a positional information of an object to be noticeable for the vehicle; and
   performing an image processing for a region of an image fetching section on the basis of an output of a noticeable object outputting section to detect the object,
   wherein during the image processing, a first technique mainly to detect the position of the object and a second technique mainly to track the object are included,
   wherein the second technique detects the object when the object detection by the first technique becomes not able to be carried out, wherein the second technique is a pattern matching that performs a tracking of the object from a correlation between a previously stored reference pattern and an output of the image fetching section and wherein, at the image processing, the reference pattern is updated when the object detection by the first technique has succeeded.

* * * * *